United States Patent [19]

Kokumai et al.

[11]  4,199,622

[45]  Apr. 22, 1980

[54] COATING COMPOSITIONS FOR USE IN COATING CAN INSIDES AND A METHOD FOR APPLYING THE SAME

[75] Inventors: Jun Kokumai; Akira Otsuki; Tadashi Ishibashi, all of Tokyo, Japan

[73] Assignee: Toyo Ink Manufacturing Co., Ltd., Tokyo, Japan

[21] Appl. No.: 696,252

[22] Filed: Jun. 15, 1976

[30] Foreign Application Priority Data

Jun. 20, 1975 [JP] Japan .................................. 50/74306
Nov. 20, 1975 [JP] Japan .................................. 50/138697

[51] Int. Cl.² .................................................. B05D 7/22
[52] U.S. Cl. ..................................... 427/239; 220/454; 260/33.6 PQ; 260/28.5 A; 260/33.6 UA
[58] Field of Search .................. 427/239, 236, 388 D, 427/375; 220/64, 454; 260/33.6 PQ, 28.5 A, 878 R, 33.6 UA; 428/461

[56] References Cited

U.S. PATENT DOCUMENTS

| | | | |
|---|---|---|---|
| 2,580,050 | 12/1951 | Sparks | 220/64 |
| 2,741,397 | 4/1956 | Shotton | 220/64 |
| 3,117,693 | 1/1964 | Vogal | 220/64 |
| 3,219,729 | 11/1965 | Meyers | 220/64 |
| 3,412,059 | 11/1968 | Stickelmeyer | 260/28.5 R |
| 3,497,466 | 2/1970 | Markulin | 220/64 |
| 3,836,494 | 9/1974 | Hekal | 428/461 |
| 3,862,266 | 1/1975 | McConnell | 427/375 |
| 3,872,040 | 3/1975 | Mollohan | 427/375 |
| 3,896,602 | 7/1975 | Petterson | 427/181 |
| 3,908,049 | 9/1975 | Fitko | 427/236 |
| 3,922,451 | 11/1975 | Amschutz | 220/64 |
| 3,968,311 | 7/1976 | Hekal | 427/236 |

FOREIGN PATENT DOCUMENTS 674300  11/1963  Canada .................................... 427/388
2514397  2/1975  Fed. Rep. of Germany ........... 427/239

*Primary Examiner*—Sam Silverberg
*Attorney, Agent, or Firm*—Frank J. Jordan

[57]  ABSTRACT

Coating compositions for use in coating can insides which consist essentially of a polar group-containing polyolefin and at least one solvent for the polyolefin, the polyolefin being dispersed in the solid particulate form in the solvent; and a method for applying the same.

10 Claims, 1 Drawing Figure

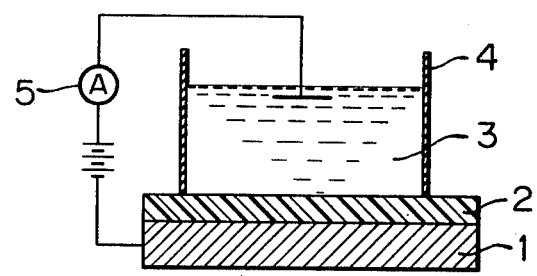

COATING COMPOSITIONS FOR USE IN COATING CAN INSIDES AND A METHOD FOR APPLYING THE SAME

This invention relates to a coating composition for use in coating can insides and a coating method. More particularly it relates a coating composition for use in coating the inside of cans particularly for food and drink and also to a method for forming a coating on the can inside.

As conventional coating materials for forming a coating on the inside of cans, there have heretofore been used epoxy-phenolic, epoxy-urea and polyvinyl chloride type coating materials. If, however, these coating materials be applied to the inside of cans, particularly those to be packed with food or drink then they will be likely to raise sanitary problems.

To avoid these problems it may be just thought of to form a coating of polyolefin which is hygienically not harmful, on the inside of cans by the use of a conventional powder coating process. In this case, however, the polyolefin powder will be difficult to attach to the corners of the cans and the resulting coating formed on the inside thereof will be thin at the corners as compared with the other portions of the inside whereby the contents canned in these cans having comparatively thin coating portions are not thoroughly protected; in addition, the powder coating process is seriously disadvantageous that it is not applicable to the formation of a coating on the base coat-formed inside of metallic cans. Furthermore, the powder coating process is not appreciated to be a desirable coating process from a resources-sparing or economical view-point since it forms resinous coatings in a larger thickness than is necessary, and said process is also very disadvantageous industrially at the present since it requires a new large-scale equipment to be installed.

There has also been known a so-called hot melt process for the formation of a polyolefin coating by melting a polyolefin, applying the melted polyolefin to a substrate and cooling the melted polyolefin for solidification thereby obtaining the polyolefin coating. The problem that an unnecessarily very thick coating is formed as mentioned above is still not solved by the use of this hot melt process and, in addition, polyolefin will not adhere to a metallic surface and epoxy type base coat and is usually necessary to add an ethylene-vinyl acetate copolymer (abbreviation: EVA) because of its high melting point. Polyethylene will increase in adhesiveness with the increase in amount of EVA added thereto, but the polyethylene so added has never been actually used as a coating of the inside of cans for food or drink since when used as such a coating, it will liberate impurities originally contained therein into food or drink thereby impairing the taste thereof.

BRIEF DESCRIPTION OF THE DRAWING

The drawing is a schematic sectional view of an apparatus for an electric current flow test as further described under Example 27.

This invention is contemplated to overcome the aforesaid drawbacks, and it has its object to provide a coating composition for use in coating the inside of cans, prepared by dispersing a polar group-containing polyolefin in a particulate solid form in at least one hydrocarbon type solvent or a mixture of at least one hydrocarbon type solvent with at least one non-hydrocarbon type organic solvent.

The polar group-containing polyolefins which may be used in the practice of this invention include polymers obtained by graft copolymerizing a polyolefin such as polyethylene or polypropylene, with a polymerizable unsaturated monomer containing at least one polar group such as a hydroxyl, epoxy or carboxyl group, the unsaturated monomer being illustrated by 2-hydroxyethyl (meth)acrylate, 2-hydroxypropyl (meth)acrylate, glycidyl (meth)acrylate, (meth)acrylic acid, fumaric acid and maleic anhydride. The term "(meth)acrylate" means acrylate and methacrylate, and "(meth)acrylic acid" means acrylic acid and methacrylic acid.

Processes for the graft copolymerization, which are per se known, include a so-called mechanochemical process comprising subjecting the main chain of a polyolefin polymer to vigorous mechanical mixing and kneading by the use of a kneader, Banbury mixer or the like in the presence of the above-mentioned polymerizable unsaturated monomer to produce radicals from said polymer and effecting the graft copolymerization at active points at which the radicals are produced and also include a process for effecting the graft copolymerization under the action of radiation. The commercially available polar group-containing polyolefins include those supplied under the trade mark of Zaikthen-F by Seitetsu Chemical Industrial Co., Ltd., and those respectively supplied under the trade marks of CMP C-902X-MA, C-802X-MA, L-900X and the like by Toa Fuel Industrial Co., Ltd. Among the aforesaid polar group-containing polyolefins, those wherein a carboxyl group-containing unsaturated monomer such as maleic acid, maleic anhydride, fumaric acid, acrylic acid or methacrylic acid is graft polymerized in a grafting ratio of 0.01–6.0% by weight, preferably 0.05–1.5% by weight, are satisfactory in adhesiveness and dispersion stability. These polar group-containing polyolefins will exhibit excellent adhesion to a chemically treated or non-treated metallic surface and base coat when coated thereon. Preferable polar group-containing polyolefins are those having an average molecular weight of at least about 1,000 and a softening point of about 100°–180° C. in view of their boiling resistance at the time of sterization.

Hydrocarbon type solvents are indispensable as solvents used in the practice of this invention. The use of only an ester, ketone or ether solvent other than a hydrocarbon type solvent will exhibit "whitening" which is caused by the precipitation of the resin (polar group-containing polyolefin) prior to the resin particles being softened soon after applying, or at the initial stage of baking, the coating composition. If baked, the coating in which the whitening has been caused will not result in the formation of a uniform and smooth coating or film.

If a hydrocarbon type solvent alone is to be used as the solvent in the practice of this invention, it should preferably be such that its boiling point is higher than the softening point of the polar group-containing polyolefin used but does not exceed a temperature which is 50° C. higher than the baking temperature for the coating of said polyolefin. The same "whitening" phenomenon is also observed when there is used a hydrocarbon type solvent the boiling point of which is not higher than the softening point of the polar group-containing polyolefin used; in this case a satisfactory coating or film is not formed either. It is undesirable to use a hydrocarbon type solvent having a boiling point higher than the baking temperature for the polyolefin coating by 50° C. or more since such a solvent is likely to remain in the baked coating. The hydrocarbon type solvents which may be used herein include aromatic hydrocarbons such as toluene and xylene; aliphatic hydrocarbons such as isooctane, nonane and decane; alicyclic hydrocarbons such as methylcyclohexane, ethylcyclohexane and decahydronaphthalene; and solvent naptha. These solvents may be used singly or jointly.

However, if, as mentioned above, in coating compositions wherein a hydrocarbon type solvent having a boiling point higher than the softening point of the polar group-containing polyolefin is used alone as the solvent, the polyolefin is such that the solvent swells the suspended particles of the polyolefin too much thereby increasing the particles in size then said coating compositions when coated by the use of a spray gun will clog the gun thereby making the coating thereof difficult and will be required to be improved in levelling and to eliminate run or sag. To avoid these disadvantages, it is advisable to use as the solvent a mixed solvent consisting of at least one hydrocarbon type solvent having a boiling point higher than the softening point of the polar group-containing polyolefin (the hydrocarbon type solvent being hereinafter sometimes referred to as "organic solvent (I)") and at least one organic solvent other than said hydrocarbon type solvent (the other organic solvent being hereinafter sometimes referred to as "organic solvent (II)"). Such hydrocarbon type solvents are illustrated before and such other organic solvents include hydrocarbon type solvents such as benzene, hexane and heptane, having a boiling point lower than the softening point of the polar group-containing polyolefin and further include alcohol type solvents such as ethanol, methanol, propanol, isopropanol, butanol, octanol, cetyl alcohol and diacetone alcohol; ester type solvents such as ethyl acetate, butyl acetate and ethylene glycol monoethyl ether acetate; ketone type solvents such as methyl ethyl ketone, methyl isobutyl ketone, cyclohexanone and isophorone; ether type solvents such as ethyl ether, ethylene glycol monomethyl ether, ethylene glycol monoethyl ether, ethylene glycol monobutyl ether, diethylene glycol monomethyl ether, diethylene glycol monoethyl ether and diethylene glycol monobutyl ether; and halogenated hydrocarbon type solvents such as carbon tetrachloride and trichloroethylene. These solvents may be used singly or jointly.

The ratios by weight of the organic solvent (I) to organic solvent (II) used are approximately in the range of 5/95–95/5, preferably 30/70–70/30, and they may be selected depending on the respective kinds of the solvent and polar group-containing polyolefin used, and the like.

When the hydrocarbon type organic solvent (I) is used alone in the practice of this invention, the following drawbacks may be observed.

The coating composition applied to the inside of a can will raise a problem as to offensive odor caused by the remaining solvent in the applied coating composition unless it is baked at a suitably high temperature for a suitably long time since the organic solvent (I) used has a comparatively high boiling point; in this convention, the baking time will not be shortened; in cases where a hydrocarbon type organic solvent (II) which has a lower boiling point as previously stated, is used in a coating composition to avoid said offensive odor, there will raise few problems as to the remaining of the solvent in the coating composition applied if it is dried soon after the application, whereas the applied coating composition if dried after the lapse of a time will sometimes produce pin holes therein although they are not identifiable with the naked eye. If the applied coating composition having pin holes therein is subjected to a current flow test to be described later then a current therethrough will be appreciated or detected; in this case, the heavy metal of the can is likely to dissolve and diffuse through the pin holes in the contents of the can. These problems may be solved by dispersing a small amount of wax together with the polar group-containing polyolefin, in the solvent.

The waxes which may be used herein are those having a softening point of about 50°–about 120° C., preferably about 70°–about 120° C. and are illustrated by polyethylene wax, polypropylene wax and paraffin.

It is undesirable to use a large amount of wax having a softening point too much lower than the boiling point of water in the preparation of the coating composition since the coating composition so prepared tends to cause "whitening" and produce blisters when boiled in water.

The wax in the coating composition is melted subsequent to the evaporation of the solvent soon after the application, or at the initial stage of baking, of the coating composition, to form a uniform and smooth coating or film without producing pin holes and eye holes therein, thereby solving a problem that after a can having such a coating formed on the inside thereof has been packed, the base metal of the can dissolves and diffuses through the coating in the contents so packed. The ratios by weight of the wax to the polar group-containing polyolefin are approximately in the range of 1/99–20/80, preferably 3/97–10/90 and are determined or selected depending on the respective kinds of the wax and polar group-containing polyolefin. For example, a wax having a comparatively low melting point may be used in smaller proportions than that having a comparatively high melting point.

In order to disperse the polar group-containing polyolefin in the solid particulate form in the solvent according to this invention, there may preferably be used a process comprising dissolving the polar group-containing polyolefin and/or the wax in the solvent under heat and then adding the thus dissolved material dropwise to a cooled solvent of the same kind as above under agitation or a process for effecting the dispersion by the use of a ball mill, sand grinder or the like. The polar group-containing polyolefin has a comparatively low viscosity and a high content of solid matter because of its dispersion in the solid particulate form, whereby it is advantageous in coating operation and solvent recovery. It may be partly swollen and dissolved to the extent that said advantages are retained. The coating composition for use in coating the inside of cans (the composition being hereinafter sometimes referred to as "can inside coating composition") may be incorporated with fillers such as pigments and with additives such as dipersion improvers as far as its features and merits are retained.

A coating method of this invention comprises applying the coating composition to the inside of a metallic can, heating the composition-applied inside to evaporate the solvent of the composition so applied and simultaneously melt the polar group-containing polyolefin thereof on the inside and then cooling the polyolefin thereby to form a coating of the polar group-containing polyolefin on the inside.

The metals which may be used as material for cans in this invention include non-treated or chemically treated aluminum, tin-plate and tin-free steel sheets as well as those having an epoxy-phenol or epoxy-urea resin undercoating formed on one face.

The top-end and bottom-end for a can may be obtained by forming metallic material for cans which has previously been coated with the coating composition or either one of them may be obtained by fitting it to the body for the can and then spraying the coating composition onto the inside of the thus fitted can body by a spraying method using a spray nozzle inserted into the inside of the fitted can body.

The amount of coating composition used for coating is at least 30 mg/100 cm$^2$, preferably about 50–100 mg/100 cm$^2$, calculated as solid matter. The temperature for heat curing the coating composition coated is preferably one which is higher than softening point of the polar group-containing polyolefin and is also higher than the boiling point of the solvent in the coating composition coated; it may be in the range of 140°–220° C., preferably about 160°–210° C., since the use of 220° C. or higher as a heat curing temperature is likely to decompose the polar group-containing polyolefin. The heating time may be in the range of 2–20 minutes, usually about 3–10 minutes and the heating may be effected in a heating furnace such as a gas oven.

The polar group-containing polyolefin may preferably be contained in the coating composition in amounts of 5–40% by weight of the composition.

This invention will be better understood by the following Examples wherein all parts and percentages are by weight unless otherwise specified.

EXAMPLE 1

Ten parts of a maleic anhydride-grafted polypropylene (grafting ratio, 0.2%; M.I., 24; supplied under the trade mark of CO902X-MA by Toa Fuel Industrial Co., Ltd.) and 90 parts of a solvent (aromatic petroleum type solvent supplied under the trade mark of Solvesso 150 by Shell Chemical Co.) were charged on a ball mill where the whole mass was kneaded at ambient temperature for 6 hours thereby to obtain a milk-white dispersion which contained the polyolefin particles of 30$\mu$ in particle size and exhibited excellent thixotropy and storage stability.

EXAMPLE 2

Ten parts of a polyethylene grafted with a carboxyl group-containing unsaturated monomer (grafting ratio, 0.3%; M.I., 10; Softening point, 105° C.; supplied under the trade mark of L-900X by Toa Fuel Industrial Co., Ltd.) and 40 parts of ethylcyclohexane were heated to 85° C. under agitation to perfectly melt the polyethylene resin. The resin so melted was then added drowise to a cooled solvent of the same kind as above under agitation thereby to obtain a milk-white dispersion which contained the polyethylene particles of 15$\mu$ in an average particle size and had excellent storage stability.

EXAMPLES 3–7, COMPARATIVE EXAMPLES 1–5

The procedure of Example 2 was followed except that the ethylcyclohexane was substituted by each of the solvents indicated in the following Table 1, thereby to obtain a dispersion.

A coating composition containing each of the dispersions obtained in Examples 2–7 and Comparative examples 1–5 was applied uniformly to a tin-plate sheet in the amount of 80 g/cm$^2$ (3 g/m$^2$, calculated as solid matter) by the use of a roll coater and then baked at 200° C. for 5 minutes thereby to obtain a coating the state or appearance of which was also shown in Table 1.

Table 1

| | Solvent | | State or Appearance of coating formed |
|---|---|---|---|
| | kind | Boiling point (°C.) | |
| Example 2 | Ethylcyclohexane | 132 | Uniform |
| Example 3 | Toluene | 110 | " |
| Example 4 | Xylene | 140 | " |
| Example 5 | Solvesso 150 | 180 | " |
| Example 6 | Solvesso 110 | 150 | " |
| Example 7 | Methylcyclohexane | 105 | Slightly non-uniform |
| Comparative example 1 | Cyclohexanone | 156 | Uneven and rough |
| example 2 | Cyclohexane | 81 | Non-uniform |
| example 3 | Benzene | 80 | " |
| example 4 | n-octanol | 195 | " |
| example 5 | Butyl acetate | 127 | " |

EXAMPLE 8

The dispersion as prepared in Example 1 was coated uniformly on a tin-plate sheet in the amount of 80 g/m$^2$ by the use of a roll coater and then baked at 200° C. for 5 minutes. The coating so obtained was tested for its properties with the result that the smoothness was found satisfactory by visual inspection, the adhesion exhibited a value of 100/100 in a cross-cut test and the flexural resistance was such that the tin-plate sheet having a coating formed on one face was folded double at this face without causing any cracks in the coating by applying impact on the sheet. The same coated sheet was further tested for boiling resistance by immersing in a boiling water for 30 minutes and for retort resistance by placing in steam at 130° C. for 90 minutes. The boiling and retort resistances were determined by observing the degree of "whitening" in the tests and examining the adhesion by the use of the cross-cut test with the result that no problems were raised.

The same coating as above was formed on the epoxy-phenol or epoxy-urea type resin base coat or undercoat which had been formed on tin-plate sheets and chemically treated steel sheets by the use of a usual process. The coatings so formed according to this invention were subjected to the same tests as above and they exhibited satisfactory test results.

EXAMPLE 9

One hundred parts of the dispersion as prepared in Example 2 were incorporated with 50 parts of ethylcyclohexane to form a coating composition which was coated on the inside of a shaped aluminum can in the amount of 110 g/m$^2$ by the use of an air spray gun and then baked at 160° C. for 5 minutes. The coating so formed was tested for its physical properties as in Example 8, thus obtaining satisfactory results except the retort resistance. The reason for the retort resistance being unsatisfactory is that the resin used in this Example was one which had a lower softening point; however, the coating was, nevertheless, useful for cans for drink which do not require retort resistance.

The same coating as above was formed on the epoxy-phenol or epoxy-urea type resin base coat or undercoat which had been formed on tin-plate sheets and chemically treated steel sheets by the use of a usual process. The coatings so formed according to this invention were subjected to the same tests as above and they exhibited satisfactory results except the retort resistance.

EXAMPLE 10

A four-necked flask was charged with 600 parts of a low-density polyethylene (M.I., 7; density, 0.922; softening point, about 110° C.; produced under the trade mark of F-2270 by Asahi Dow Co., Ltd.) and 2,400 parts of xylene to form a mixture thereof which was heated to 110° C. under agitation in a nitrogen atmosphere to form a perfect solution of the polyethylene in the xylene, after which the solution so formed was incorporated with 10 parts of maleic anhydride and 2 parts of benzoyl peroxide, and the whole was agitated at 110° C. for one hour.

The whole in the flask, after allowed to cool, was incorporated with 7500 parts of water at 60° C. to form a mixture thereof which took about 15 minutes to be raised to about 80° C. and continued to be agitated at that temperature for additional 5 minutes. After the end of the agitation, the mixture was separated into upper and lower layers, the upper layer mainly containing a solution of a polar group-containing polyethylene in xylene and the lower one mainly containing water.

The amount of the unreacted maleic acid contained in the water of the lower layer (after a first run) was 5 parts.

The same procedure as mentioned above was several times repeated; the amount of the unreacted maleic acid contained in the lower water layer is 3.1 parts after a second run, 0.6 parts after a third run, 0.2 parts after a fourth run, 0.1 part after a fifth run and ND (not detected) after a sixth run. From this result it was found that the polyethylene was graft copolymerized with 1.0 part of maleic anhydride and the grafting ration was 0.17 wt.%.

The xylene solution of the polar group-containing polyolefin, so purified with warmed water was further incorporated with 3,000 parts of xylene and the whole mass was heated to distil off a small amount of water contained therein thereby obtaining a stable dispersion of the polyolefin. The dispersion so obtained was coated on the inside of an aluminum can as in Example 9, thus obtaining the same satisfactory result as in Example 9.

EXAMPLE 11

The procedure of Example 11 was followed except that the polyethylene was substituted by polypropylene (density, 0.91; M.I., 9.0; softening point, 145° C.; produced by Mitsui PetrochemicalIndustrial Co., Ltd.) and a temperature of 120° C. was used as the reaction temperature, thereby to obtain a dispersion of the polypropylene in xylene. The dispersion so obtained was tested as previously mentioned with the result that it also exhibited a satisfactory retort resistance.

EXAMPLE 12

Ten parts of a grafted polyethylene (softening point, about 105° C.; supplied under the trade mark of L-900X by Toa Fuel Industrial Co., Ltd.) and 40 parts of xylene were together mixed and heated to 85° C. under agitation to perfectly dissolve the resin in the solvent. The solution so obtained was added dropwise to 50 parts of cooled xylene under agitation thereby to obtain a milk-white dispersion containing the resinous particles of 15μ in average particle size. The dispersion so obtained was incorporated with 50 parts of isopropanol under agitation thereby to obtain a coating composition of this invention. The thus obtained coating composition was stable not only soon after its preparation but also even three months after its preparation and did not clog a spray gun when coated by the use thereof.

The coating composition was coated on the inside of a shaped aluminum can in the amount of 70 g/m² by the use of an air spray gun, and the coating so formed was baked at 180° C. for 5 minutes. The coating so baked was visibly found satisfactory in smoothness and tested for its physical properties with the result that it was also satisfactory in adhesion, flexural resistance and boiling resistance.

EXAMPLES 13–24

The procedure of Example 12 was followed except that the isopropanol was substituted by each of the solvents as indicated in Table 2 to obtain a coating composition of this invention. The coating compositions so obtained and coatings formed thereof were found to be excellent in performance.

Table 2

| | |
|---|---|
| Example 13 | Benzene |
| Example 14 | Cyclohexane |
| Example 15 | Ethylene glycol monoethyl ether acetate |
| Example 16 | Methyl ethyl ketone |
| Example 17 | Ethyl acetate |
| Example 18 | Butyl acetate |
| Example 19 | Methanol |
| Example 20 | Ethylene glycol monoethyl ether |
| Example 21 | Cyclohexanone |
| Example 22 | Diacetone alcohol |
| Example 23 | Methanol/Diacetone alcohol (50/50) mixed solvent |
| Example 24 | Benzene/cyclohexane (50/50) mixed solvent |

EXAMPLE 25

Ten parts of a grafted polyethylene (Trade mark, L-900X; this polyethylene being the same as used in Example 1) and 110 parts of toluene were together mixed under agitation and heated to 85° C. to perfectly dissolve the polyethylene in the toluene. The solution so obtained was cooled to produce a milk-white dispersion containing the polyethylene particles of 15μ in average particle size. The dispersion was then incorporated with 30 parts of ethanol under agitation to obtain a coating composition of this invention which was suitable as a coating material and satisfactory in storage stability. The coating composition so obtained was uniformly applied to a tin-plate sheet in the amount of 100 g/m² by the use of a spray gun, and the coating so formed was baked to 160° C. for 5 minutes. The thus baked coating was satisfactory in smoothness and other properties.

EXAMPLE 26

Ten parts of a grafted polypropylene (supplied under the trade mark of C-902X-MA by Toa Fuel Industrial Co., Ltd.) and 80 parts of an aromatic petroleum solvent (supplied under the trade mark of Solvesse 150 by Shell Chemical Co.) were charged on a ball mill where the whole mass was kneaded at ambient temperature for 6 hours thereby to obtain a milk-white dispersion containing the polypropylene particles of about 30μ in average particle size. This dispersion was incorporated with 10 parts of diethylene glycol monomethyl ether under agitation thereby obtaining a coating composition which was satisfactory in storage stability and capable of being easily coated. The coating composition so obtained was uniformly coated on a tin-plate sheet in the amount of 80 g/m² by the use of a roll coater, and the coating so formed was then baked at 200° C. for 5 minutes. The thus baked coating was placed in steam at 130° C. for 90 minutes and found to be excellent also in retort resistance.

EXAMPLE 27

Nine and a half (9.5) parts of a grafted polyethylene (softening point, 105° C.; supplied under the trade mark of L-900X by Toa Fuel Industrial Co., Ltd.), 0.5 parts of microcrystalline wax (Melting point, 70° C.; supplied under the trade mark of Nisseki Microwax 155 by Nippon Oil Co., Ltd.) and 40 parts of methylcyclohexane were together mixed under agitation and heated to 85° C. for perfect dissolution. The solution so obtained was added dropwise to 50 parts of cooled methycyclohexane under agitation thereby to obtain a milk-white dispersion containing the resin particles of 15μ in average particle size. This dispersion was incorporated with 50 parts of isopropanol under agitation to prepare a coating composition which was stable not only immediately after its preparation but also three months after its preparation and did not clog a spray gun when coated by the use of the spray gun.

The coating composition so prepared was then was applied to a tin-plate sheet in the amount of 70 g/m² by using an air spray gun, and the coating formed on the sheet was baked at 160° C. for 5 minutes. The thus baked coating was smooth and found to have no eye holes and pin holes therein since the flow of electric current was not detected when the coating was tested by a current flow test to be described later. When the baked coating was subjected to a test for boiling resistance, it did not exhibit "whitening" and produce blisters thus indicating that it was useful as a coating composition. In addition, the baked coating did not have odor.

The accompanying drawing shows a sectional view of an apparatus for an electric current flow test. In the drawing, material for a vessel 4 is placed liquid-tightly on a coating 2 formed on a metallic plate 1 to form the vessel 4 in which an aqueous solution 3 of sodium chloride is then charged. It is known whether or not the coating 2 has eye holes and/or pin holes by detecting with an ammeter 5 electric current flowing through the coating 2 if any.

COMPARATIVE EXAMPLE 9

The procedure of Example 27 was followed except that the 0.5 parts of wax were not used, to form apparently the same baked coating. When the baked coating was subjected to a current flow test, the current flowed; this indicating that the baked coating had eye holes and/or pin holes therein.

EXAMPLE 28

Ten parts of a grafted polyethylene (softening point, 105° C.; supplied under the trade mark of L-900X by Toa Fuel Industrial Co., Ltd.) and 40 parts of Solvesso 150 (Aromatic petroleum type solvent supplied under the trade mark of Solvesse 150 by Shell Chemical Co.) were together mixed and heated to 85° C. under agitation to perfectly dissolve the resin in the solvent. The solution so obtained was added dropwise to 50 parts of xylene under agitation thereby to obtain a milk-white dispersion containing the resinous particles of 50μ in average particle size. The thus obtained dispersion was incorporated with 50 parts of isopropanol under agitation to obtain a coating composition. The coating composition so obtained was applied to a tin-plate sheet in the amount of 70 g/m² by the use of an air spray gun and then baked at 180° C. for 5 minutes. The baked coating so obtained was subjected to a current flow test with the result that no current flowed thereby indicating the absence of eye holes and pin holes in the coating.

EXAMPLES 29–33

Table 2

| Example | Kind of wax | Softening point |
| --- | --- | --- |
| 29 | Polyethylene type wax (produced under the trade mark of Polywax 500 by Breco Co. | 86° C. |
| 30 | Polyethylene type wax (produced under the trade mark of Uniwax A by Breco Co.) | 85° C. |
| 31 | Microcrystalline wax (produced under the trade mark of Be Square-175A by Breco Co.) | 79° C. |
| 32 | Microcrystalline wax (produced under the trade mark of Be Square-195A by Breco Co.) | 91° C. |
| 33 | Microcrystalline wax (produced under the trade mark of Nisseki Microwax 180 by Nippon Oil Co.) | 84° C. |

EXAMPLES 29-33

The procedure of Example 27 was followed except that the wax was substituted by each of the waxes shown in Table 2, thereby to obtain a desired coating composition which is capable of forming coatings having excellent properties.

EXAMPLE 34

Nine and a half (9.5) parts of a grafted polypropylene (softening point, 160° C.; supplied under the trade mark of C-902X-MA by Toa Fuel Industrial Co., Ltd.), 0.5 parts of polyethylene wax (softening point, 122° C.; produced under the trade mark of Hiwax 410 by Mitsui Petrochemical Industrial Co., Ltd.) and 40 parts of xylene were together mixed and heated to 85° C. under agitation to form a perfect solution. The solution so formed was added dropwise to 50 parts of toluene thereby to obtain a milk-white dispersion containing the solid particles of 15μ in average particle size. The dispersion so obtained was then incorporated with 50 parts of isopropanol under agitation to produce a coating composition.

The coating composition so produced was coated on a tin-plate sheet in the amount of 70 g/m² and then baked at 200° C. for 5 minutes. The thus baked coating had no odor of the solvents used and, therefore, none of the solvents used were considered to remain in the baked coating. The baked coating was subjected to a current flow test with the result that no current flowed thereby indicating the absence of eye holes and pin holes in the coating; it was further placed in steam at 130° c. for 90 minutes whereby it was found excellent in retort resistance.

What is claimed is:

1. A method for forming a uniform coating on metallic can insides from a coating composition which consists essentially of (1) a polar group-containing polyolefin prepared by graft copolymerizing a polyolefin with a carboxyl-containing unsaturated monomer in a grafting ratio of 0.01–6.0% by weight and (2) at least one hydrocarbon type solvent for the polyolefin, the polyolefin being dispersed in the solid particulate form in the solvent and the boiling point of the solvent being higher than the softening point of the polyolefin but not 50° C. higher than tha baking temperature of the coating of the polyolefin to be formed, comprising applying the coating composition to the metallic can insides to form thereon a coating thereof, heating the coating so formed to a baking temperature higher than the softening point of the polar-containing polyolefin but not 50° C. lower than the boiling point of the solvent to distil off the solvent and simultaneously melt the solid particles thereby forming a uniform melted coating and then cooling the thus formed melted coating to obtain the uniform coating.

2. A method according to claim 1, wherein the solvent is a mixed solvent consisting of at least one hydrocarbon type solvent having a boiling point higher than the softening point of the polyolefin but not 50° C. higher than the baking temperature of the coating of the polyolefin to be formed and at least one non-hydrocarbon type organic solvent in a ratio by weight of from 5/95 to 95/5.

3. A method according to claim 1, wherein the carboxyl-containing unsaturated monomer is a member selected from the group consisting of maleic anhydride, maleic acid, fumaric acid, acrylic acid and methacrylic acid.

4. A method according to claim 1, wherein said grafting ratio is 0.05–1.5% by weight.

5. A method for forming a uniform coating on metallic can insides from a coating composition which consists essentially of (1) a polar group-containing polyolefin prepared by graft copolymerizing a polyolefin with a carboxyl-containing unsaturated monomer in a grafting ratio of 0.01–6.0% by weight, (2) wax and (3) at least one hydrocarbon type solvent for the polyolefin and wax, the polyolefin and wax being dispersed in the solid particulate form in the solvent, and the boiling point of the solvent being higher than the softening point of the polyolefin but not 50° C. higher than the baking temperature of the coating of the polyolefin to be formed, comprising applying the coating composition to the metallic can insides to form thereon a coating thereof, heating the coating so formed to a baking temperature higher than the softening point of the polar group-containing polyolefin but not 50° C. lower than the boiling point of the solvent to distil off the solvent and simultaneously melt the solid particles thereby forming a uniform melted coating and then cooling the thus formed melted coating to obtain the uniform coating.

6. A method according to claim 5, wherein the solvent is a mixed solvent consisting of at least one hydrocarbon type solvent having a boiling point higher than the softening point of the polyolefin but not 50° C. higher than the baking temperature of the coating of the polyolefin to be formed and at least one non-hydrocarbon type organic solvent in a ratio by weight of from 5/95 to 95/5.

7. A method according to claim 5, wherein the carboxyl-containing unsaturated monomer is a member selected from the group consisting of maleic anhydride, maleic acid, fumaric acid, acrylic acid and methacrylic acid.

8. A method according to claim 5, wherein the wax is one having a softening point of 50°–120° C.

9. A method according to claim 5, wherein the wax is a member selected from the group consisting of polyethylene wax, polypropylene wax and paraffin.

10. A method according to claim 5, wherein said grafting ratio is 0.05–1.5% by weight.

* * * * *